United States Patent [19]
Hsieh et al.

[11] Patent Number: 6,133,376
[45] Date of Patent: *Oct. 17, 2000

[54] RUBBER FOR A HIGH-PERFORMANCE TIRE TREAD

[75] Inventors: Henry Chi-Chen Hsieh; Sean Chwan-Sheng Huang; Fu Lin; Peter J. D. Lee, all of Kaohsiung, Taiwan

[73] Assignee: Taiwan Synthetic Rubber Co., Taipei, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/990,813

[22] Filed: Dec. 15, 1997

[30] Foreign Application Priority Data

Dec. 13, 1997 [TW] Taiwan ................................. 86118831

[51] Int. Cl.$^7$ ............................. C08L 83/08; C08L 47/00; C08L 7/00; C08L 9/06
[52] U.S. Cl. ......................... 525/101; 525/102; 525/314; 525/237; 524/495; 524/262; 524/492
[58] Field of Search ..................... 525/237, 102, 525/314, 99, 101; 524/495, 262, 492

[56] References Cited

U.S. PATENT DOCUMENTS

| | | | |
|---|---|---|---|
| 3,980,625 | 9/1976 | Sakamoto et al. | 526/67 |
| 4,396,743 | 8/1983 | Fujimaki et al. | 525/99 |
| 4,471,093 | 9/1984 | Furukawa et al. | 525/237 |
| 4,866,131 | 9/1989 | Fujimaki et al. | 525/237 |
| 4,940,756 | 7/1990 | Broekhuis et al. | 525/237 |
| 5,066,721 | 11/1991 | Hamada et al. | 525/102 |
| 5,134,199 | 7/1992 | Hattori et al. | 525/314 |
| 5,162,409 | 11/1992 | Mroczkowski | 524/262 |
| 5,430,086 | 7/1995 | Saito et al. | 524/495 |
| 5,504,140 | 4/1996 | Zanzig et al. | 524/526 |
| 5,569,697 | 10/1996 | Ferrandino et al. | 524/492 |

FOREIGN PATENT DOCUMENTS

| | | |
|---|---|---|
| 107859 | 4/1994 | Japan . |
| 6-136187 | 5/1994 | Japan . |

OTHER PUBLICATIONS

"Polymer Handbook" second edition, p. IV–16, Feb. 1999.
Seymour, R. "Polymer Chemistry", second edition, p. 73–74, Feb. 1999.
Whelan T., "Polymer Technology Dictionary", Feb. 1999.

*Primary Examiner*—David W. Wu
*Assistant Examiner*—Tanya Zalukaeva
*Attorney, Agent, or Firm*—Rabin & Champagne, P.C.

[57] ABSTRACT

The rubber for high-performance tire tread of the invention basically includes: (a) about 10%~50% weight percentage low molecular weight coupled copolymer of aromatic vinyl compound and conjugated diene or conjugated diene monopolymer, having a molecular weight of $5\times10^4$~$35\times10^4$, (b) about 10%~60% weight percentage middle molecular weight uncoupled copolymer of aromatic vinyl compound and conjugated diene, having a molecular weight of $10\times10^4$~$80\times10^4$, and (c) 5~60% weight percentage high molecular weight coupled copolymer of aromatic vinyl compound and conjugated diene, having a molecular weight of $45\times10^4$~$200\times10^4$.

12 Claims, No Drawings

RUBBER FOR A HIGH-PERFORMANCE TIRE TREAD

BACKGROUND OF THE INVENTION

Field of the Invention

The invention relates in general to a composition of a solution type styrene butadiene rubber (SBR), and more particular to a rubber suitable for a tread stock of a tire.

The composition of the rubber of the invention basically includes; at least one 10%~50% weight percentage low molecular weight coupled copolymer of aromatic vinyl compound and conjugated diene or conjugated diene monopolymer, at least one 10%~60% weight percentage middle molecular weight linearly uncoupled copolymer of aromatic vinyl compound and conjugated diene, and at least one 5~60% weight percentage high molecular weight coupled copolymer of aromatic vinyl compound and conjugated diene. The coupled site of the rubber composition is coupled by the compounds of tin, phosphorous, gallium and silicon. The central atoms consist of tin, phosphorous, gallium and silicon. The rubber of the invention has improved processability and is superior in milling and mixing in a Banbury mixer, and also has a lower rolling resistance, which therefore results in lower consumption of gasoline and diesel oil, and higher wet traction. The elastomer of the invention is suitable as the rubber for tread stock, especially for the racing tire and the pneumatic tire.

Some conventional solution type SBR fabricated by continuous processes have broader molecular weight distribution. This solution type SBR is limited to the reactive speed ratio of styrene to butadiene so that the vinyl group content in the microscopic structure of the butadiene monomer is hard to change. Also, most of the terminal functional groups of this solution type SBR are not modified so that this SBR will not be able to uniformly mix with the carbon black in the process of masticate. Moreover, the bonding of carbon black is weak and is not be able to satisfy the conflicting requirement of both low rolling resistance and high wet traction. On the other hand, solution type SBR fabricated by batch type processes have narrower molecular weight distribution. This SBR includes uncoupled styrene/butadiene copolymers and coupled styrene/butadiene copolymers with tin, phosphorous, gallium, and silicon as coupling center. Due to the narrower molecular weight distribution of this copolymers, this solution type SBR tends to congregate during the process of mastication, using mill and Banbury mixer. Consequently, the application of the solution type SBR is limited. However, the present invention has superior processability as using mill and Banbury mixer and satisfies the conflicting requirement of low rolling resistance and high wet traction.

The term, "amount of vinyl group", indicates the weight percentage of conjugated diene unit polymerized at the position 1, 2 or 3, 4 in this invention. For example, the amount of vinyl group for 1,3-butadiene means the ones at the position 1, 2. For an isoprene, it includes the total amount of the vinyl group at the position 1, 2 and 3, 4.

The method disclosed in U.S. Pat. No. 3,980,625, utilizing the solution rubber of the reflux portion in a reactor on a continuous type process to increase the distribution of the molecular weight and consequently eliminate the cool flow and improve processibility. Conventionally, several liquid rubber with different Mooney viscosity are mixed and also they have to be reacted in separated reactors before being mixed. The method disclosed in this patent overcomes the disadvantage in the mixture process for mixing the liquid rubber with different Mooney viscosity. However, the terminal functional group is not modified and the coupling agent is not utilized in this invention so that the rubber of this patent is not compatible with the carbon black. This rubber is therefore not suitable for tire tread. However, the rubber of the present invention has a broader molecular weight distribution. Also, the branch type SBR with tin, phosphorous, gallium, or silicon as coupling center of the invention overcomes the difficulties in processing and strengthens the compatibility and bonding with carbon black.

In the background description of the U.S. Pat. No. 4,866,131, it is stated that a large amount of aromatic oil, as a softening agent, are is added for producing the high-performance tire to increase the road gripping ability and obtain higher tan δ (the hysteresis loss value). This method is unfavorable because some important characteristics of tire tread such as rupture strength, wear resistance and blow out resistance are significantly marred by the increased softening agent. It is also mentioned that conventionally, for producing high-performance tire of racing tire, high-styrene styrene-butadiene copolymer rubber formed by emulsion polymerization is utilized to obtain higher hysteresis loss. However, this rubber has poor vulcanizability, low rupture strength and low rupture resistance. The solution type conjugated diene/aromatic vinyl compound copolymer of the present invention overcomes these drawbacks. In the U.S. Pat. No. 4,866,131, low molecular weight copolymer of an aliphatic diene and an aromatic vinyl compound (the molecular weight in the range of 2000 to 50000) is used in a hydrocarbon solution instead of the conventional aromatic oil. However, a large amount of the initiator has to be consumed and a large amount of inorganic compound such as lithium chloride and hydroxy lithium produced after the reaction is not able to solve in the solvent. Moreover, an additional reactor is required and the copolymer has to be blended with the styrene-butadiene rubber in another tank. However, the solution type conjugated diene/aromatic vinyl compound copolymer of the present invention contains this low molecular weight copolymer and the reaction can be performed in one reactor without the step of blending and the problem of producing a large amount of insoluble organic compounds, which overcomes the drawbacks of the U.S. Pat. No. 4,866,131.

In the U.S. Pat. No. 4,940,756, a mixture consisting of two different copolymer compositions of the conjugated diene/aromatic vinyl compound is disclosed. Theses two different copolymer block compositions have two different values of glass transition temperature (Tg) so that the mixture satisfies the requirement of low rolling resistance and high wet gripping ability. Within the mixture, a copolymer block of conjugated diene and aromatic vinyl compound has a Tg value higher than −55° C. and another copolymer block of conjugated diene and aromatic vinyl compound has a Tg value lower than −65° C. The block with a Tg value higher than −55° C. contributes the rubber the characteristics of high wet gripping ability together with high rolling resistance and low abrasion resistance. The other block with a Tg value lower than −65° C. provides contrary properties. The block with a Tg value higher than −55° C. contains high amount of aromatic vinyl compound and the vinyl in the conjugated diene unit is higher. The other block with a Tg value lower than −65° C. contains low amount of aromatic vinyl compound and the vinyl in the conjugated diene unit is lower. Due to the incompatibility of theses two blocks and the narrow distribution of the molecular weight of their mixture, the block mixture tends to stick on the kneader and the blade of the Banbury mixer during the processes of vulcanization and mastication. Moreover, during the second and the third periods of the reaction, gradual additions of the monomers have to be performed to maintain the random arrangement of conjugated diene and aromatic vinyl compound. Consequently, the vinyl content in conjugated diene unit can not be adjusted and it takes long to polymerize. However, the process of the invention makes the vinyl content in the momomer of conjugated diene and aromatic vinyl compound adjustable in each block. Also, a single and quick addition of monomer is acceptable by the present invention and the copolymer of the present invention has superior processibility.

In the U.S. Pat. No. 4,396,743, a method using a wider distribution of Tg in tan δ-temperature curve with a equal Tg is proposed. This method provides the rubber the properties of low rolling resistance and high wet traction but not be able to overcome the problem of poor processibility resulted from the narrow distribution of molecular weight.

SUMMARY OF THE INVENTION

It is therefore an object of the invention to provide a rubber composition for tire tread including racing tire having excellent wet traction (0° C., tan δ) and improved Flex-Cracking but maintaining lower rolling resistance (50° C., tan δ).

It is another object of the invention to provide a copolymer of conjugated diene and aromatic vinyl compound with tin, phosphorous, gallium and silicon as coupling centers to have superior distribution of carbon black and better processiblity.

It is therefore a further object of the invention that using at least three kinds of copolymers of conjugated diene and aromatic vinyl compound with three different molecular weight to broaden the distribution of the molecular weight so that the difficulties of processing and mixing of conventional solution type SBR are eliminated.

It is a further object of the invention to provide a rubber with three blocks A, B, and C for a high-performance tire tread. Block A is the copolymer of conjugated diene and aromatic vinyl compound coupled with compounds of tin, phosphorous, gallium and silicon, having a molecular weight of about $5 \times 10^4 \sim 35 \times 10^4$. Block B is the copolymer of conjugated diene and aromatic vinyl compound but not coupled with compounds of tin, phosphorous, gallium and silicon, having a molecular weight of about $10 \times 10^4 \sim 80 \times 10^4$. Block C is the copolymer of conjugated diene and aromatic vinyl compound coupled with compounds of tin, phosphorous, gallium and silicon, having a molecular weight of about $45 \times 10^4 \sim 200 \times 10^4$. Blocks A, B, and C can have equal or different ratio of conjugated diene to aromatic vinyl compound and equal or different vinyl group content in the conjugated diene/aromatic vinyl compound unit.

The rubber compositions of the invention can be applied in normal or high-performance racing tire and therefore it can be applied in car tire or motorcycle tire.

Other objects, features, and advantages of the invention will become apparent from the following detailed description of the preferred but non-limiting embodiment.

DETAILED DESCRIPTION OF THE INVENTION

The process of the invention can be either continuous type or batch type. The initiator can be added once or more but the coupling agent has to be added for at least twice. As the pure monomer or the mixture of the conjugated diene/aromatic vinyl compound takes the polymerization reaction with the organolithium compounds in the organic hydrocarbon inert solvent and in the existence of adequate randomizer. As the reaction is 90% completed, coupling agent with 10%~80% theoretical coupling amount is added to couple. The monomer or mixture of conjugated diene/aromatic vinyl compound is further added either with or without the further adding of the organolithium. Again as the reaction is 90% completed, coupling agent with 10%~80% theoretical coupling agent is addded to couple; then, terminant is added to stop the reaction. Alternatively, after the second adding of the coupling agent, the conjugated diene/aromatic vinyl compound and coupling agent can be even further added; after that, terminant is added to stop the reaction.

The conjugated diene of the invention is an organic diene, having a carbon number of 4 to 8, such as 1,3 butadiene, isoprene, 2,3-dimethyl-1,3-butadiene, 2,4-pentadiene and 1,3-pentadiene and preferably 1,3-butadiene or isoprene.

The mono-aromatic vinyl compound of the invention is an arene having only one vinyl group, including styrene, p-methylstyrene, o-methylstyrene, m-methylstyrene, a-methylstyrene, p-ethylstyrene, o-ethylstyrene, α-vinylnaphthalene and β-vinylnaphthalene. They can be separately used or used as a mixture.

The organic hydrocarbon inert solvent of the invention is the polymerization medium for performing the invention. It includes aliphatic solvent such as n-pentane, n-hexane, n-heptane, n-octane, n-decane, isoheptane, isohexane, isohetane, isooctane and isodecane. It also includes alicyclic solvent such as cyclopentane, methylcyclopentane, cyclohexane, methylcyclohexane, ethylcyclohexane, 1,4-dimethylcyclohexane. It further includes aromatic solvent such as benzene, toluene, ethylbenzene, xylene, diethylbenzene and propylbenzene. These solvent can be separately used or used as a mixture, preferably cyclohexane.

Generally speaking, while the organic hydrocarbon inert solvent is used as polymerization medium, due to the low polymerizing rate of the mono-aromatic vinyl compound or the conjugated diene and the great difference of the polymerizing reactivity of these two, the adding of the polar solvent reduces the difference of the polymerizing reactivity and also rises the polymerizing rate. Once the adding amount of the polar solvent is over the critical value, the arrangement of the mono-aromatic vinyl compound and the conjugated diene will change from tapered block to random molecular structure. The existence of the polar solvent makes the amount of 1,2-vinyl group of the conjugated diene arise so that the amount of the polar solvent is depended on its polarity and the association degree with the initiator, organolithium compound. The polar solvent of the invention can be ether, tertiary amine and the like. Ether includes tetrahydrofuran (THF), dimethylether, diethylether, dipropylether, tetrahydropyran, methyl ethyl ether, ethyl propyl ether, ethylene glycol dimethylether, ethylene glycol diethyl ether, diglyme, anisole, ethyl phenyl ether. THF and diethylether are preferred. Tertiary includes trimethylamine, triethylamine, tripropylamine, dimethyl phenylamine, diethylphenylamine, methylpyridine, and the like. Triethylamine is preferred.

The initiator of the invention includes lithium, and organolithium with alkyl group, alicyclic group or aromatic group, such as methyllithium, ethyllithium, propyllithium, butyllithium (including n-butyllithium, iso-butyllithium, sec-butyllithium, and tert-butyllithium), hexyllithium, phenyllithium, 2-ethylhexyllthium, cyclohexyllithium, phenylmethyl lithium, phenethyl lithium, and methylbenzyl lithium, n-butyllithium, iso-butyllithium sec-butyllithium, and tert-butyllithium are preferred.

The coupling agent of the invention can be represented by $R_mMX_{n-m}$ or $(RO)_kMX_{n-k}$. M represents atoms like tin, phosphorous, gallium, and silicon. X represents haloid element. R represents paraffin hydrocarbon, cyclanes or aromatic compound. n represents the possible bonding no. of the central atom. For example, n of tin, gallium and silicon is 3; n of phosphorous is 3, wherein $m \leq n$, $n-m \geq 1$, $n-k \geq 0$. Preferably, R includes methyl group, ethyl group, propyl group, isopropyl group and butyl group and X includes chloride and bromide. The coupling agent includes: silicone (IV) chloride, tin(IV) chloride, gallium(IV) chloride, tin(III) chloride, phosphorus trichloride, methyltrichlorosilane, ethyltrichlorosilane, propyltrichlorosilane, phenyltrichlorosilane, tolyltrichlorosilane, vinyltrichlorosilane, dimethyldichlorosilane, dimethyldichlorosilane, dipropyldichlorosilane, methylphenyldichlorosilane, phenylvinyldichlorosilane, divinyldichlorosilane, dichlorosilane, methylphenyltrichlorosilane, phenyltrichlorostannane, tolyltrichlorostannane, vinyltrichlorostannane, dimethyldichlorostannane, methylphenyldichlorostannane, phenylvinyldichlorostannane, divinyldichlorostannane, methylgallium trichloride, ethylgallium trichloride, phenylgallium trichloride, vinylgallium trichloride, dichloromethylphosphine, dichloroethylphosphine, dichloropropylphosphine, dichlorovinylphosphine, dichlorophenylphosphine, tetramethoxysilane, tetramethoxystannane, gallium(IV) methoxide, trimethyl phosphite, tetraethoxysilane, tetraethoxystannane, triethoxyphosphine, trimethoxysilane, chlorotrimedoxysilane, triethoxysilane, chlorotriethoxysilane, triphenoxysilane, chlorotriphenoxysilane, chlorotrimethoxystannane, chlorotriethoxystannane, chlorodimethoxyphosphine, chlorodiethoxyphosphine, dimethylphosphine, diethylphosphine, butyltrichlorostannane, butyltrichlorosilane, and bromotriphenylstannane. Silicone (IV) chloride, tin(IV) chloride, phosphorous trichloride, tetramethoxysilane, tamethoxystannane, and trimethyl phosphite are preferred.

The terminant of the invention includes active hydrogen atom or haloid atom but not active enough to couple with two or more than two functional groups such as water, acid, $R_3SiX$, $R_3SnX$, $R_2PX$ (wherein P represents paraffin, cycloparaffin, or aromatic compound and X represents haloid atom), alcohol and aldehyde. Within these terminant, water, chlorotrimethylsilane, and chlorotrimethylstannane are preferred.

During the process of polymerization, the system has to be kept in a condition without impurities. The impurities include water, oxygen, carbon dioxide, alkyne, halide, alcohol, organic acid and inorganic acid. Mono-aromatic vinyl compound and conjugated diene have to be purified before leading into the reactive system. The purification process has to be taken place in the system purged with nitrogen, argon or helium.

The content of mono-aromatic vinyl compound preferrably to be about 5~70% of total monomer. As the content is out higher than 70%, small blocks of styrene polymer forms, which makes the tire soften during operation and even reducing the blowout strength and abrasion resistance.

The concentration for polymerization is about 5~30%, preferably 10~20%. If the concentration for polymerization is lower than 5%, the cost of recycle solvent will be too high. On the other hand, as the concentration is higher than 30%, there will be difficulties in stirring, temperature control and tendency of forming gel.

The temperature for polymerization in the polymerization reaction of the present invention is about −30° C.~150° C., preferably 30° C.~180° C. As the temperature is too high, the functional group at the lithium terminal of the reactant loses it activity, which therefore stops the polymerization reaction and the reactivity of the impurity and the active lithium terminal arises. On the contrary, as the temperature is too low, the reaction rate is too slow and therefore economic effect is much less.

In the polymerization reaction of the invention, conjugated diene/aromatic vinyl compound and the coupling agent are injected foe L times, wherein $L \geq 2$. The ratio of injected conjugated diene/aromatic vinyl compound injected in each time is about 0.5~20. The ratio of maximum total monomer amount (conjugated diene plus aromatic vinyl compound) to minimum total monomer amount in each injection is about 0.5~20. The ratio of the maximum amount of the coupling agent to the minimum amount of it in each injection is about 0.5~20. The total injected amount of the coupling amount is about 5%~90% of the theoretical grafting extent of functional groups of the organolithium compounds. As the theoretical grafting amount of functional groups of the coupling agent is 4, the amount used is about (0.05~0.90)× the mole of organolithium compound/4. Preferably, L is 2 or 3, considering the simplicity and the reproducibility in industry. The amount of the organolithium used in the polymerization reaction is substantially 0.0055%~5% (weight percentage) of the total monomer amount, but preferably 0.01%~1%. The organolithium can be injected in one time or for several times. As the injection amount of organolithium is too low, the impurities in the solution system will be reacted and the activity of which is lost. As the injected amount of organolithium is too high, the molecular weight of the polymer produced by the polymerization becomes too low and the final product will become liquid state or even ropey semi-solid state, which tends to occur distoration under stress in room temperature and lose strength of raw material rubber.

The amount of the polar solvent for the polymerization reaction has a polarity of about 100 ppm~10% of the polarity of the organic hydrocarbon inert solvent. The polar solvent used in the polymerization reaction of the present invention is about 100 ppm~10% to control the amount of the 1,2-vinyl group in the conjugated diene unit. As the amount of the 1,2-vinyl group is too low, Tg becomes too low and the monomer unit of the conjugated diene/aromatic vinyl group will not randomize but form a gradually increasing block unit, which is not suitable for the tire tread. As the amount of the 1,2-vinyl group is too high, Tg becomes too high and the low temperature resistance of the polymerized rubber is poor; moreover, rolling resistance, blow out strength and elasticity are also poor.

At least one stabilizer must be added to the final product to prevent degradation resulted from oxygen, ultraviolet, ozone and heat. An agent reacted with the functional group of the active lithium terminal is added to make the final product lose activity before the adding of the stabilizer or directly adding the stabilizer to work as reaction terminant. The final copolymer solution or suspension are conjugated by hot water to coagulate to form rubber grain. After evaporation, filtration, centrifugation and mechanical squashing dehydration to obtain the product of the invention.

The reaction time of the invention in each step is substantially 4 minutes to 4 hours. The copolymerization can be controlled by consistent temperature, heat-insulation or the both. The time for adding the coupling agent is when the monomer transformation rate reaches about 60% or more in each step, preferably 80% or more. If the coupling agent is added as the transformation rate is substantially lower than 60%, the molecular weight distribution of the polymer will not be wide enough, which tends to congregate during the process of mastication, using mill and Banbury mixer. Generally, the second and third injections of the monomer can be taken place at 1 minute to 2 hours after the injections of the monomer in the second and the third steps, respectively. The ways for injecting conjugated diene/aromatic vinyl compound can be simultaneous injection or continuous injection.

The final product of the invention has a molecular weight distribution in a range of about 1.5~3.5, wherein the molecular weight can have the following composition:

(a) at least one with a molecular weight of about $5 \times 10^4 \sim 35 \times 10^4$, coupled with coupling agent;

(b) at least one with a molecular weight of about $10 \times 10^4 \sim 80 \times 10^4$, not coupled with coupling agent; and (c) at least one with a molecular weight of about $45 \times 10^4 \sim 200 \times 10^4$, coupled with coupling agent.

Carbon black can be added for physical property reinforcement according to the polymer composition of the invention. Different kinds of carbon black having different grain size and structure, any used for rubber industry can be applied in the present invention, which includes FEF, GPF, HAF, and ISAF. Preferrably, those which has high reinforcement such as ISAF and IISAF with iodine absorbence not lower than 80 mg/g and dibutylphthalate oil absorbence not lower than 100 ml/100 g. Carbon black is about 20~80 parts/100 parts of rubber in weight, preferably 30~70 parts/100 parts. During the processing of the polymer of the invention, petroleum extender oil such as aromatic oil, paraffinic oil, and naphthenic oil can be further added.

Other chemicals can be further added in the vulcanized rubber of the invention such as brimstone, vulcanized assistant, vulcanized promoter, antioxidant, and filler. Continuous processes through such as kneader, the Banbury mixer, and the miller to blade and mix can be performed to obtain the final bladed mixture.

COMPARISON EXAMPLE

A 5-liter autoclave including a stirrer and a jacket is used as a reactor. About 2.8 liter of cyclohexane solvent, about 30 g of tetrahydrofurayl solvent, and about 45 g of styrene and about 255 g of 1,3-butadiene are added. Until they are completely disolved, n-butyllithium is slowly added for initiate the reaction in about 35° C. Within 4 hours of reaction, the reaction rate reaches about 90%, about 4.58 g of tin(IV) chloride coupling agent solution is added; about one hour after the adding of the coupling agent, about 0.3 g of water is added to terminate the activity of the functional group at the lithium terminal of the reactant. Finally, about 20 g of stabilier solution (TNPP/Irganox 1076-13/7) is added, wherein the mole ratio of n-butyllithium to tin(IV) chloride is about 7. The copolymer obtained by this method has a Mooney viscosity of about 67, the coupling rate is about 69.9%, the Tg value determined by the differential scanning calorimetry (DSC) is about −36° C., the molecular weight distribution is about 1.51, number average molecular weight is about $42.5 \times 10^4$, the conjugated styrene amount is about 16.1%, the content of 1,2-vinyl group is about 47%, the uncoupled one has a molecular weight of about $25 \times 10^4$, and the ones coupled with tin has a molecular weight of about $89.5 \times 10^4$.

Embodiment 1

A 5-liter autoclave including a stirrer and a jacket is used as a reactor. About 2.8 liter of cyclohexane solvent, about 30 g of tetrahydrofurayl solvent, about 128 g of 1,3-butadiene and about 23 g of styrene and are added. Until they are completely disolved, n-butyllithium is slowly added for initiate the reaction in about 35° C. Within 2 hours of reaction, as the reaction rate reaches about more than 90%, about 2.3 g of tin(IV) chloride coupling agent solution is added; about one hour after the adding of the coupling agent, about 128 g of 1,3-butadiene and about 45 g of styrene and are further added for reaction. Within 4 hours of the latter step of reaction, the reaction rate reaches about 90%, about 2.3 g of tin(IV) chloride coupling agent solution is further added. Within one hour after the second adding of the coupling agent, about 0.3 g of water is added to terminate the activity of the functional group at the lithium terminal of the reactant. The stabilier as stated in the comparison example is added, wherein the mole ratio of n-butyllithium to tin(IV) chloride is about 7. The copolymer obtained by this method has a Mooney viscosity of about 65.3, the Tg value determined by the differential scanning calorimetry is about −36.5° C., the molecular weight distribution is about 2.44, number average molecular weight is about $29.6 \times 10^4$, the conjugated styrene content is about 15.8%, the content of 1,2-vinyl group is about 47%, the uncoupled one has a molecular weight of about $42.9 \times 10^4$, the ones coupled with tin have a molecular weight of about $12.8 \times 10^4$ and $154.1 \times 10^4$, and the coupling ratio of the ones coupled with tin is about 62.3%.

Embodiment 2

The instrument of the comparison is used herein for reaction. About 2.8 liter of cyclohexane solvent, about 30 g of tetrahydrofurayl solvent, about 85 g of 1,3-butadiene and about 15 g of styrene and are added. Until they are completely disolved, n-butyllithium is slowly added for initiate the reaction in about 35° C. As the reaction rate reaches about more than 90%, about 0.9 g of tin(IV) chloride coupling agent solution is added; about one hour after the adding of the coupling agent, about 85 g of 1,3-butadiene and about 15 g of styrene and are further added for the second step reaction. As the reaction rate of the second step reaction reaches about more than 90%, about 1.4 g of tin(IV) chloride coupling agent solution is added; about one hour after the adding of the coupling agent, about 85 g of 1,3-butadiene and about 15 g of styrene and are further added for the third step reaction. As the reaction rate of the third step reaction reaches about more than 90%, about 2.3 g of tin(IV) chloride coupling agent solution is further added. Within one hour after the second adding of the coupling agent, about 0.3 g of water is added to terminate the activity of the functional group at the lithium terminal of the reactant. The stabilier as stated in the comparison example is added, wherein the mole ratio of n-butyllithium to tin(IV) chloride is about 7. The copolymer obtained by this method has a Mooney viscosity of about 59, the Tg value determined by the differential scanning calorimetry is about −37.4° C., the molecular weight distribution is about 2.39, number average molecular weight is about $28.2 \times 10^4$, the conjugated styrene content is about 16.1%, the content of 1,2-vinyl group is about 47%, the uncoupled one has a molecular weight of about $70.5 \times 10^4$, the ones coupled with tin have a molecular weight of about $124.5 \times 10^4$, $17.0 \times 10^4$ and $6.7 \times 10^4$, and the coupling ratio of the ones coupled with tin is about 70.5%.

Referenced Example

A commercialized product is taken as an example. The commercial product has a Mooney viscosity of about 65, the Tg value determined by the differential scanning calorimetry is about $-39.9°$ C., the molecular weight distribution is about 1.63, number average molecular weight is about $37.8 \times 10^4$, the conjugated styrene content is about 15.4%, the content of 1,2-vinyl group is about 45.5%, the uncoupled one has a molecular weight of about $24.2 \times 10^4$, the ones coupled has a molecular weight of about $81.0 \times 10^4$, and the coupling ratio of the ones coupled with tin is about 58.4%.

The products formed by the methods of the comparison example, embodiment 1, embodiment 2, and referenced example are tested firstly by adding the following ingredients.

The ingredients includes:

| | |
|---|---|
| rubber | 100 |
| brimstone | 1.75 |
| stearic acid | 1 |
| carbon black (IRB #6) | 50 |
| zinc oxide | 3 |
| TBBS | 1 |

TABLE 1

PROPERTY ANALYSIS OF SEVERAL PRODUCTS AFTER MIXING AND VULCANIZATION

| SAMPLE | COMPARISON EXAMPLE | EMBODIMENT 1 | EMBODIMENT 2 | REFERENCED EXAMPLE |
|---|---|---|---|---|
| Mooney viscosity of raw material rubber | 66.5 | 65.3 | 59.0 | 65.1 |
| Mooney viscosity after mixing | 95.2 | 96.6 | 83.0 | 90.5 |
| 160° C. test of vulcanized curve | | | | |
| $M_L$(N*M) | 0.62 | 0.88 | 0.63 | 0.62 |
| $M_H$(N*M) | 5.53 | 5.03 | 4.82 | 5.64 |
| scorch time $t_2$ (min) | 5.06 | 5.21 | 5.61 | 6.40 |
| vulcanization time $t_{90}$ (min) | 13.81 | 14.89 | 15.17 | 16.20 |
| vulcanization rate RC(N*M/min) | 1.00 | 0.73 | 0.75 | 0.91 |
| mechanical property after 145° C. vulcanization | | | | |
| 25 min vulcanization 300% modulus (kg/cm$^2$) | 138 | 132 | 124 | 112 |
| 35 min vulcanization 300% modulus (kg/cm$^2$) | 167 | 154 | 155 | 166 |
| 50 min vulcanization 300% modulus (kg/cm$^2$) | 180 | 169 | 164 | 187 |
| anti-pull strength (kg/cm$^2$) | 228 | 220 | 244 | 236 |
| elongation rate (%) after 35 min vulcanization | 394 | 408 | 450 | 405 |
| hardness (Shore A) | 65 | 65 | 64 | 66 |
| elasticity rate (%) | 53.2 | 52 | 52 | 53.2 |
| anti-tear strength (kg/cm) | 65 | 66 | 64 | 68 |
| Akron abrasion (3300 rev · 6 p · cc) | 0.3682 | 0.3822 | 0.3839 | 0.4074 |
| Flex Cracking no. of rotation | 3000 | 10000 | 22000 | 9000 |
| carbon black mixing time (min) | 2 | 1.75 | 1.25 | 2.5 |
| miller processibility* | 3 | 4 | 5 | 3 |
| result of dynamic viscoelastic tester (10Hz · 0.5% strain rate) | | | | |
| tan δ (0° C.) | 0.165 | 0.200 | 0.194 | 0.156 |
| tan δ (50° C.) | 0.118 | 0.111 | 0.120 | 0.112 |
| vulcanized rubber Tg | −28 | −31 | −28 | −31 |

The mill processibility in Table 1 is ranked from 1~5. The nearer the ranking value approaches 5, the better the effect is. On the contrary, the nearer the ranking value approaches 1, the worse the effect is.

As shown In Table 1, the products according to the embodiments of the invention are superior to the conventional ones in processibility, wet traction, flex cracking and carbon black mixing time.

While the invention has been described by way of example and terms of the preferred embodiment, it is to be understood that the invention is not limited thereto. To the contrary, it is intended to cover various modifications and similar arrangements. The appended claims, therefore, should be accorded the broadest interpretation so as to encompass all such modifications and similar arrangements.

What is claimed is:

1. Rubber for a high-performance tire tread, comprising:
   at least one low molecular weight conjugated diene polymer selected from a group consisting of a copolymer of conjugated diene and an aromatic vinyl compound and a conjugated diene monomer,
   wherein said low molecular weight conjugated diene polymer is about 10%~50% weight percent,
   wherein said low molecular weight conjugated diene polymer is coupled with a first coupling agent having a formula $R_mMX_{n-m}$ or $(RO)_kMX_{n-k}$, and
   wherein said low molecular weight conjugated diene polymer has a molecular weight of about $5\times10^4$~$35\times10^4$;
   at least one middle molecular weight copolymer of conjugated diene and aromatic vinyl compound,
   wherein said middle molecular weight copolymer is linearly uncoupled,
   wherein said middle molecular weight copolymer is about 10%~60% weight percent, and
   wherein said middle molecular weight copolymer has a molecular weight of about $10\times10^4$~$80\times10^4$; and
   at least one high molecular weight copolymer of conjugated diene and aromatic vinyl compound,
   wherein said high molecular weight conjugated diene polymer is about 5%~60% weight percent,
   wherein said high molecular weight conjugated diene polymer is coupled with a second coupling agent having the formula $R_mMX_{n-m}$ or $(RO)_kMX_{n-k}$, and
   wherein said high molecular weight conjugated diene polymer has a molecular weight of about $45\times10^4$~$200\times10^4$;
   wherein within said first coupling agent $R_mMX_{n-m}$ or $(RO)_kMX_{n-k}$, and within said second coupling agent $R_MMX_{n-m}$ or $(RO)_kMX_{n-k}$ M represents tin, phosphorus, gallium or silicon, X represents halide element, R represents paraffin hydrocarbon, cyclane or aromatic compound, n represents a possible bonding number of a central coupling atom, and n is 4 or 3, $m \leq 2$ and $k \leq 4$, said rubber having at least three peaks of molecular weight distribution.

2. The rubber as claimed in claim 1, wherein said conjugated diene has a carbon number of 4 to 8, and is selected from a group consisting of 1,3-butadiene, isoprene, 2,4-pentadiene and 1,3-pentadiene.

3. The rubber as claimed in claim 2, wherein said conjugated diene is selected from the group consisting of 1,3-butadiene, isoprene and a mixture of 1,3-butadiene and isoprene.

4. The rubber as claimed in claim 1, wherein said aromatic vinyl compound is selected from the group consisting of styrene, p-methylstyrene, o-methylstrene, and a-methylstyrene.

5. The rubber as claimed in claim 4, wherein said aromatic vinyl compound is styrene.

6. The rubber as claimed in claim 1, wherein said aromatic vinyl compound is about 5%~80% by weight of total polymer.

7. The rubber as claimed in claim 1, wherein 1,2-vinyl group of polymer unit is about 20%~80% by weight of total conjugated diene monomer unit.

8. The rubber as claimed in claim 1, wherein said coupling agent or $R_mMX_{n-m}$ or $(RO)_kMX_{n-k}$, R is selected from the group consisting of methyl group, ethyl group, propyl group, isopropyl group and butyl group and X includes chloride and bromide.

9. The rubber as claimed in claim 8, wherein said coupling agent is selected from the group consisting of silicone(IV) chloride, tin(IV) chloride, tin(III) chloride, phosphorus trichloride, dimethyldichlorosilane, dimethyldichlorostannane, tetramethoxysilane, tetramethoxystannane, trimethyl phosphite, tetraethoxysilane, tetraethoxystannane, chlorotrimethoxysilane, chlorotriethoxysilane, chlorotriphenoxysilane, chlorotrimethoxystannane, chlorotriethoxystannane, chlorodimethoxyphosphine, trimethyl phosphite, butyltrichlorostannane, butyltrichlorosilane, and bromotriphenylstannane.

10. The rubber as claimed in claim 1, wherein said coupling agent is selected from the group consisting of silicone(IV) chloride, tin(IV) chloride, phosphorus trichloride, tetramethoxysilane, and a mixture of silicone (IV) chloride, tin(IV) chloride, phosphorus trichloride, and tetramethoxysilane.

11. The rubber as claimed claimed in claim 1, wherein the rubber has a molecular weight distribution of about 1.5~3.5.

12. The rubber as claimed in claim 1, wherein the amount of said low molecular weight coupled polymer and said high molecular weight coupled polymer is about 20%~80% weight percentage of the amount of said low molecular weight coupled polymer, said middle weight uncoupled polymer, and said high molecular weight coupled polymer.

* * * * *